United States Patent [19]
Bienert et al.

[11] Patent Number: 4,749,227
[45] Date of Patent: Jun. 7, 1988

[54] PREASSEMBLED INSTALLATION UNIT FOR SLIDING AND LIFTING ROOFS OF MOTOR VEHICLES

[75] Inventors: Horst Bienert, Gauting; Georg Kohlpaintner, Martinsried; Hans Jardin, Inning, all of Fed. Rep. of Germany

[73] Assignee: Webasto-Werk W. Baier GmbH & Co., Gauting, Fed. Rep. of Germany

[21] Appl. No.: 903,585

[22] Filed: Sep. 4, 1986

[30] Foreign Application Priority Data

Sep. 9, 1985 [DE] Fed. Rep. of Germany ....... 3532104

[51] Int. Cl.$^4$ .......................... B60J 7/05; B60J 7/057
[52] U.S. Cl. ..................................... 296/221; 296/222; 296/223
[58] Field of Search ............... 296/216, 220, 221, 222, 296/223; 74/501 R

[56] References Cited

U.S. PATENT DOCUMENTS

| | | | |
|---|---|---|---|
| 3,078,122 | 2/1963 | Werner | 296/222 |
| 4,056,274 | 11/1977 | Jardin et al. | 296/223 |
| 4,081,926 | 4/1978 | Jardin | 296/223 X |
| 4,272,122 | 6/1981 | Schatzler et al. | 296/221 |
| 4,293,161 | 10/1981 | Lutz | 296/213 |
| 4,332,416 | 6/1982 | Lutz et al. | 296/216 |
| 4,350,385 | 9/1982 | Schatzler | 296/221 X |
| 4,422,687 | 12/1983 | Kaltz et al. | 296/223 X |
| 4,475,767 | 10/1984 | Grimm et al. | 296/221 |
| 4,647,104 | 3/1987 | Kohlpaintner et al. | 296/221 |

FOREIGN PATENT DOCUMENTS

| | | | |
|---|---|---|---|
| 3100743 | 1/1982 | Fed. Rep. of Germany | 296/216 |
| 0030817 | 2/1985 | Japan | 74/501 R |
| 446991 | 5/1936 | United Kingdom | 296/222 |
| 504745 | 5/1939 | United Kingdom | 296/222 |
| 1346506 | 2/1974 | United Kingdom | . |
| 2068304 | 8/1981 | United Kingdom | 296/216 |

*Primary Examiner*—Dennis H. Pedder
*Attorney, Agent, or Firm*—Sixbey, Friedman & Leedom

[57] ABSTRACT

Preassembled installation unit for sliding and lifting roofs of motor vehicles of the type wherein a fixed roof surface has a roof opening that is openable and closable by a cover, the opening being surrounded in front and on the sides by a frame, which extends behind the roof opening under the fixed roof surface. The installation unit is provided with track forming side guide rails along which front and rear sliders can move, side cover supports which are connected to the front sliders and, by pivoting elements, to the rear sliders, drive cables that engage the rear sliders and can be brought to engage a drive, and guide channels for the drive cables which, in area of the front edge of the roof opening, are formed by guide pipes and on the sides, by cable channels. The frame is a part of the installation unit. The guide rails are integrated with the tracks and cable channels in the side frame parts. The guide pipes are connected to the front area of the frame. The guide rails and cable channels are covered by cover rails incorporating forward and lateral stops to enable performance testing of the unit without the cover or a dummy cover.

18 Claims, 7 Drawing Sheets

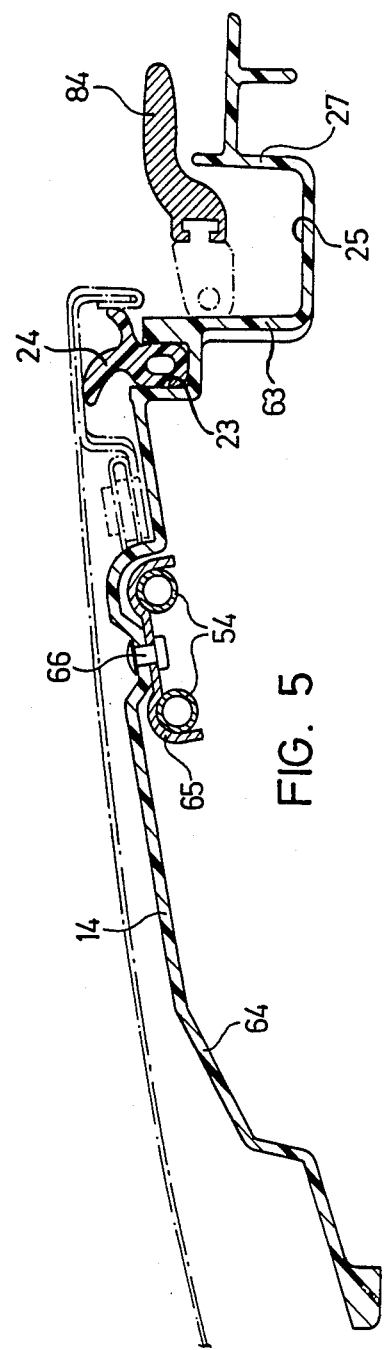
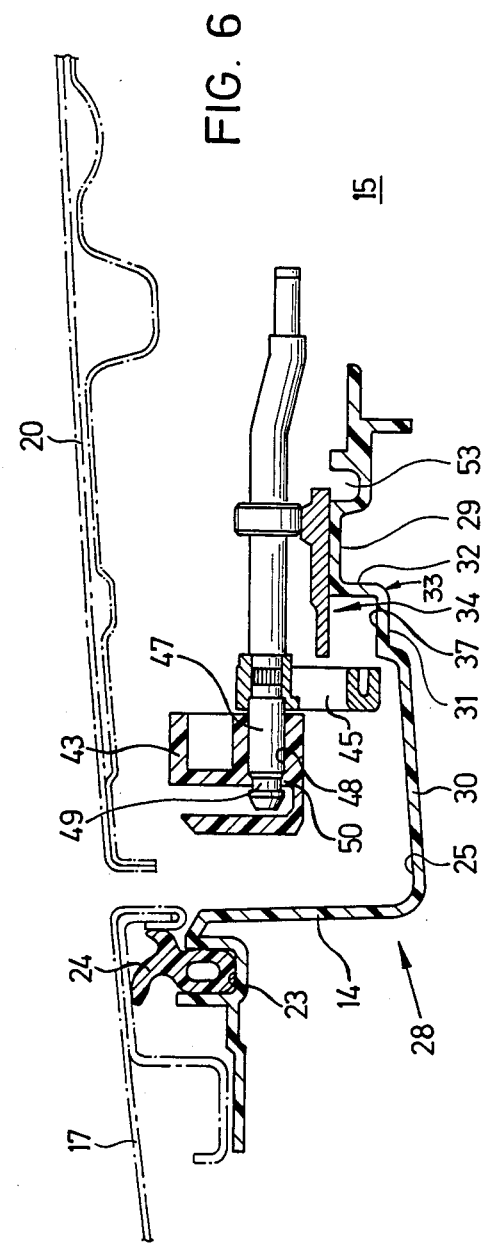

PREASSEMBLED INSTALLATION UNIT FOR SLIDING AND LIFTING ROOFS OF MOTOR VEHICLES

BACKGROUND AND SUMMARY OF THE INVENTION

The invention relates to a preassembled installation unit for sliding and lifting roofs of motor vehicles, in whose fixed roof surface a roof opening is formed that is openable and closable by a cover, which opening is surrounded in front and on the sides by a frame that extends to form a space receiving the cover when it is pushed back behind the roof opening under the fixed roof surface, whereby the installation unit is provided with:

side guide rails connected to one another, forming tracks, sliders that can move rearward and forward along the tracks, side cover supports, which are connected to the front sliders and, by pivoting elements, to the rear sliders, pressure resistant drive cables which engage the rear sliders and for their part can be brought to engage a drive, and guide channels for the pressure resistant drive cables whereby the guide channels are formed by guide pipes in the area of the front edge of the roof opening as well as on the sides by cable channels in the guide rails.

In a known installation unit of this type (German Pat. No. 29 14 855 and corresponding U.S. Pat. No. 4,332,416) the two side guide rails are connected to one another on their front ends by a cover, on whose underside the guide pipes are fastened which directly lead into the cable channels of the guide rails. In addition to the guide rails, sliders, side cover supports, drive cables and guide pipes, the installation unit comprises a gutter strip that engages under the rear edge of the roof opening when the cover is closed and is movable with the cover, guided in the guide rails by additional sliders and connected to lateral shields by rods.

In using the known installation unit on the assembly line of the vehicle manufacturer, the frame is fastened to the underside of the fixed roof surface, e.g., welded to it. Then, the installation unit is inserted into the frame and bolted to the frame. Then the cover is connected to the installation unit. The known preassembled installation unit represents a relatively unstable structure which must be put in a holding device that simulates the frame for performance testing prior to installation. Because of production tolerances the actual frame dimensions do not always agree exactly with those of the holding device for the performance test so that the results of the performance testing are not absolutely transferable to the conditions after installation in the vehicle. Thus, in certain cases, troublesome subsequent adjustments may be necessary. Further, there is the danger that the unstable installation unit will be damaged, e.g., be bent, during shipping or during handling on the assembly line of the vehicle manufacturer. This, too, can require time-consuming repair.

A primary object of the preset invention, therefore, is to provide a preassembled installation unit, for a motor vehicle sliding and lifting roof which further simplifies the installation of the sliding and lifting roof on the assembly line of the vehicle manufacturer and the necessary handling there. It is a further object of the invention to achieve the noted benefits while, at the same time, obtaining a sliding and lifting roof that is particularly economical in space and weight.

These objects are achieved according to a preferred embodiment of the invention by incorporating the frame, formerly a separate component, into the installation unit, the guide rails being integrated with the tracks and cable channels in the side frame parts, and the guide pipes being connected with the front area of the frame.

Because the frame is made of a part of the installation unit, the installation unit becomes a rigid sturdy structure which, to a large extent, is not susceptible to damage in shipping. A guarantee is provided that an installation unit, which has passed the performance test conducted before installation, will also work satisfactorily after installation. The mutual connection of the installation unit and frame, necessary in the previously known installation unit, is eliminated in the assembly on the assembly line of the vehicle manufacturer.

It is true that, in the case of a so-called spoiler roof of the type having a cover that can be moved out over the rear fixed roof surface, it is also known (German Offenlegungsschrift 31 46 905 and corresponding U.S. Pat. No. 4,475,767) to provide a roof frame, consisting of an upper and lower part, which forms tracks for the slide rails and guide channels, supporting the cover, for the pressure resistant drive cables. Aside from this type of roof differing in principle from that of the present invention, in this case the drive cables in the area of the front edge of the roof opening are also placed in guide channels of the two-part frame. As a result, the frame in its front area is expensive, heavy and bulky.

In accordance with a further aspect of the invention, the drive, for example, a hand crank drive or a motor drive, can also be a component of the installation unit. This has the particular advantage that the drive, in combination with the functioning parts of the installation unit associated with it, can be pretested. The drive is advantageously mounted on a front frame part connected to the side frame parts.

A contribution to weight reduction and simplified assembly at the sliding roof manufacture is also attained, in accordance with the invention, if cable channels and/or tracks formed by the side frame parts are upwardly open and are covered at least in the their front area by cover rails placed on the side frame parts. Preferably, the cover rails are provided with stops limiting the forward movement of the front sliders. Such stops prevent the sliders from slipping out of the tracks during the performance test of the installation unit. They allow the performance test to be conducted quickly and reliably without a cover or dummy cover.

The ends of guide pipes that are turned toward the front ends of the cable channels are advantageously put into upwardly open recesses of side frame parts. As a result, an exact alignment of the guide pipes with the cable channels at the transition site is automatically enforced. Advantageously, moreover, at least a radially projecting holding element, which engages in a widening of the recess of the side frame part, is attached in each case to the ends of guide pipes turned toward the front ends of cable channels. As a result, the axial forces acting on the guide pipes can be absorbed simply and reliably. Preferably, the cover rails are provided on their underside with jaws for clamping the ends of the guide pipes. Additional holding and clamping devices, which would increase the weight of the installation unit and make its assembly more difficult, are thus eliminated.

In a further feature of the invention, tracks defined by the side frame parts and cover rails are open on one side, and stop surfaces preventing sideways slipping off of at least the front sliders from the tracks are provided. Also this feature contributes to the fact that the preassembled installation unit can be tested reliably and exactly, without a cover or cover dummy having to be put on for this test.

Advantageously, the cover rails are provided, in the area defining the tracks, with at least one opening for the passage of an element to hold the cover down. Advantageously, an up stop surface is formed on the cover rails adjacent to the back end of each opening. With such stop surfaces, an undesirable movement of the lateral shields is prevented during their pivoting movement by pivot elements. Preferably, the cover rails assume a multiple function in the way explained above, while at the same time can carry a link pin working with a respective connecting link guide of the pivot elements.

In another aspect of the invention, the installation unit additionally comprises, in a way known in the art (U.S. Pat. No. 4,332,416), a gutter strip that is connected to the lateral shields and is guided by sliders along the tracks, this gutter after installation of the installation unit in the vehicle, engaging under the rear edge of the roof opening when the cover is closed or pivoted out.

In addition, the installation unit can be complemented by a wind deflector that is hinged on the front frame part and is pivotable as a function of a movement of the lateral shields. Finally, the installation unit can advantageously be supplemented by a seal intended to be placed on the underside of the fixed roof surface, this seal being placed in a groove formed on the upper side of the frame and running around it.

The cover rails can advantageously be designed as zinc die-cast parts. This makes it possible to produce the multiple-function cover rails with especially high precision measurements. In principle the frame can be designed as a sheet metal frame. Preferably, the frame consists of plastic, especially of sheet molding compound (SMC).

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIGS. 4 to 10 are enlarged sections along lines IV—IV, V—V, VI—VI, VII—VII, VIII—VIII, IX—IX and X—X, respectively, of FIG. 1.

DETAILED DESCRIPTION OF THE PREFERRED EMBODIMENTS

Figure 1:
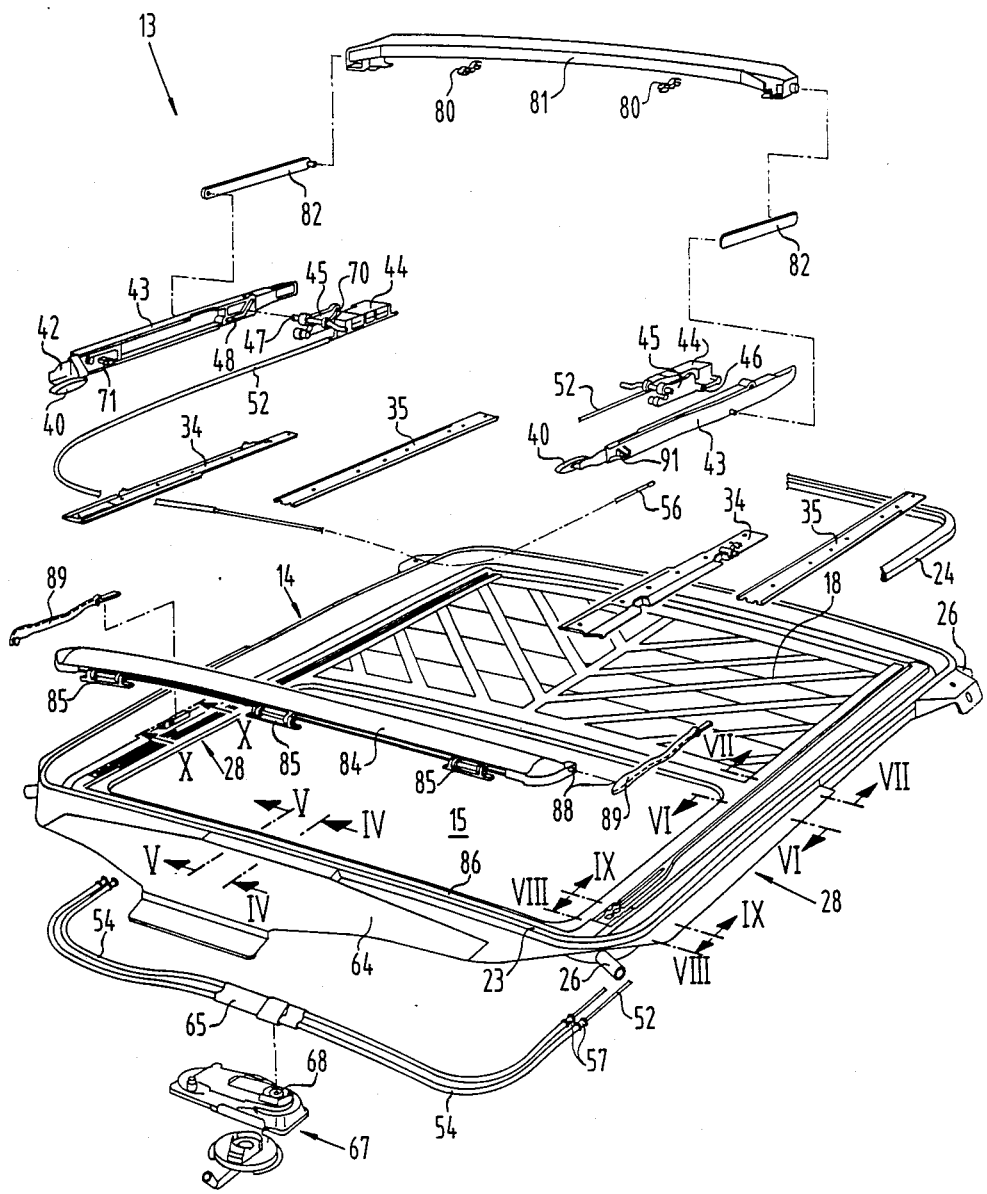
FIG. 1 is an exploded perspective view of the various components of a preassembled installation unit according to a preferred embodiment of the invention.
Figure 2:
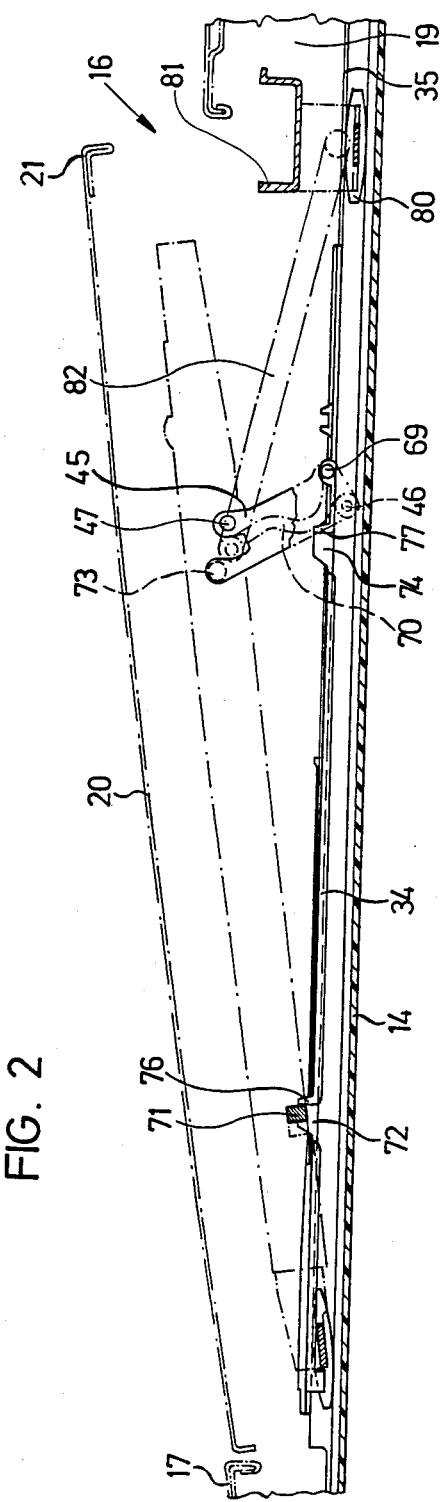
FIG. 2 is a diagrammatic partial longitudinal section of an installation unit installed in a vehicle with the cover pivoted out.

The preassembled installation unit 13 illustrated in FIG. 1 has a one-piece frame 14 formed of sheet molding compound (SMC), which defines a frame opening 15 which, after installation of installation unit 13 in a vehicle, is aligned with a roof opening 16 of a fixed roof surface 17 (FIG. 2). Frame 14 surrounds roof opening 16 in front and on its sides, and extends with its rear part 18 under the fixed roof surface 17 to form a space 19 rearwardly of roof opening 16 (FIG. 2). Installation unit 13 carries, in its final assembled condition, a cover 20 by which roof opening 16 can be selectively opened and closed. Cover 20 can be pivoted upwardly into a tilted-out position, shown in FIG. 2, wherein its rear edge 21 is disposed above roof surface 16, or cover 20 can be slid rearwardly under fixed roof surface 17 into space 19 after its rear edge 21 has been lowered.

Figure 8:
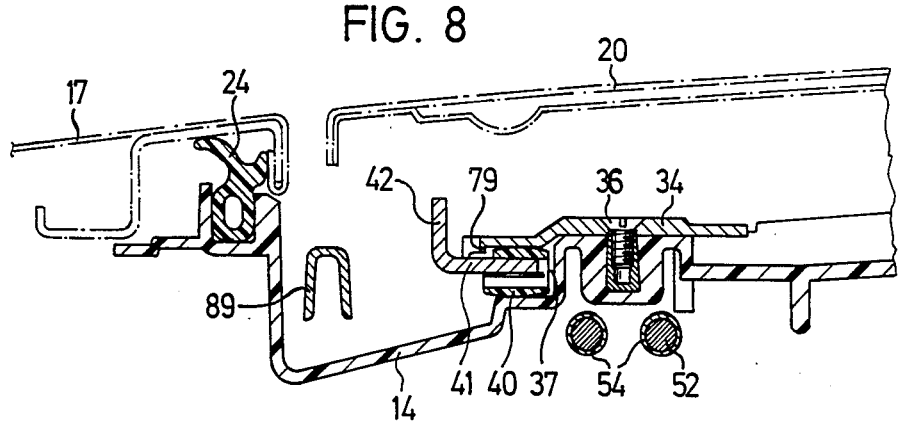
Figure 9:
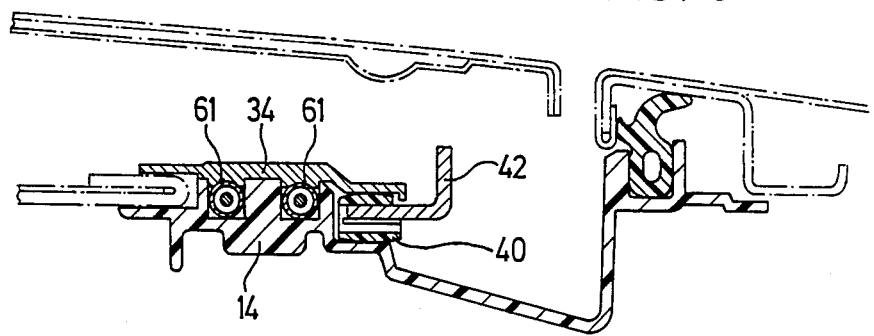

Frame 14 is provided on its upper side with a perimetric groove 23 in which a seal 24 is placed. During assembly of installation unit 13, seal 24 is pressed against the underside of fixed roof surface 17. At the radially inner side of groove 23 is a relatively deep water channel 25 in which water that falls when cover 20 is pivoted out or slid back collects. This water is carried off in a known way by discharge pipes 26 which open into water channel 25. Water channel 25 is bounded in a direction inwardly toward frame opening 15 in the front frame area by a wall 27 (FIGS. 4 and 5) and in the area of side frame parts 28 by a frame elevation 29. The side of frame elevation 29 adjoining water channel 25 has a horizontal guide surface 31 that is upwardly offset from the bottom 30 of the water channel and a vertical guide surface 32 connected thereto. Guide surfaces 31, 32 together constitute a guide rail 33 over which a cover rail 34 is applied in the forward area flanking opening 15 and over which a cover strip 35 is attached in the rearward area flanking space 19, the cover rails and strips being mounted on the top side of the side frame elevations 29. Cover rails 34 and cover strips 35 are connected to frame 14, for example, by screws 36 (FIG. 8). Guide surfaces 31, 32 as well as the parts of cover rail 34 and cover strip 35 lying over guide surface 31 define a guide track 37 at each side of frame 14.

Front sliders 40 can slide in tracks 37 in the longitudinal direction of the vehicle. Front sliders 40 sit, in each case, on a horizontal leg 41 of a metal angle plate 42, which is embedded in a respective lateral shield 43 that is formed of injection molded plastic and is used to support the cover once the installation unit has been installed in a vehicle. Further, shoe-like parts of rear sliders 44 (FIG. 1), to which in each case the one end of a lever-shaped pivot element 45 is connected, also run in tracks 37. The joint connecting the respective pivot element 45 with rear slider 44 is indicated by 46 in FIGS. 1 and 2. On the end away from joint 46, each pivot element 45 carries a link pin 47 that projects laterally outward and which is slidably guided in a guide block slot 48 of lateral shield 43. Wall parts 50 of guide block slot 48 have a section 49 of link pin 47 of a reduced dimension inserted therein, whereby a slipping down of lateral shield 43 from the associated link pin 47 is prevented. Lateral shield 43 in this way is articulated to pivot element 45 in a manner permitting it to make a limited longitudinal movement in relation to the pivot element. On the other hand, pivot element 45 and lateral shield 43 are not relatively displaceable in a lateral direction (i.e., the axial direction of link pin 47).

Figure 7:
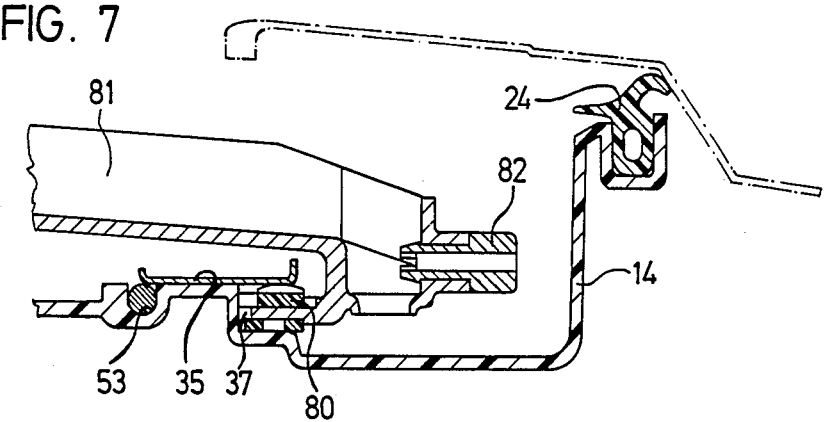

Each of the rear sliders 44 is fixedly connected to an end of a pressure resistant drive cable 52. Drive cables 52 extend from rear sliders 44 along side frame parts 28. They are thus guided in each case in a cable channel 53 of frame 14. Cable channels 53 are covered by cover rails 34 and cover strips 35 in away illustrated in FIGS. 6 and 7 to prevent the drive cables from jumping out. Near the front end of side frame parts 28 drive cables 52 go into a respective guide pipe 54, which extends along the front edge of frame opening 15. On each of opposite sides of the frame, guide pipes 54 are aligned with another cable channel 55 of a respective side frame part 28. Cable channels 55 receive ends 56 of drive cables 52 at a distance from rear sliders 44.

Figure 3:
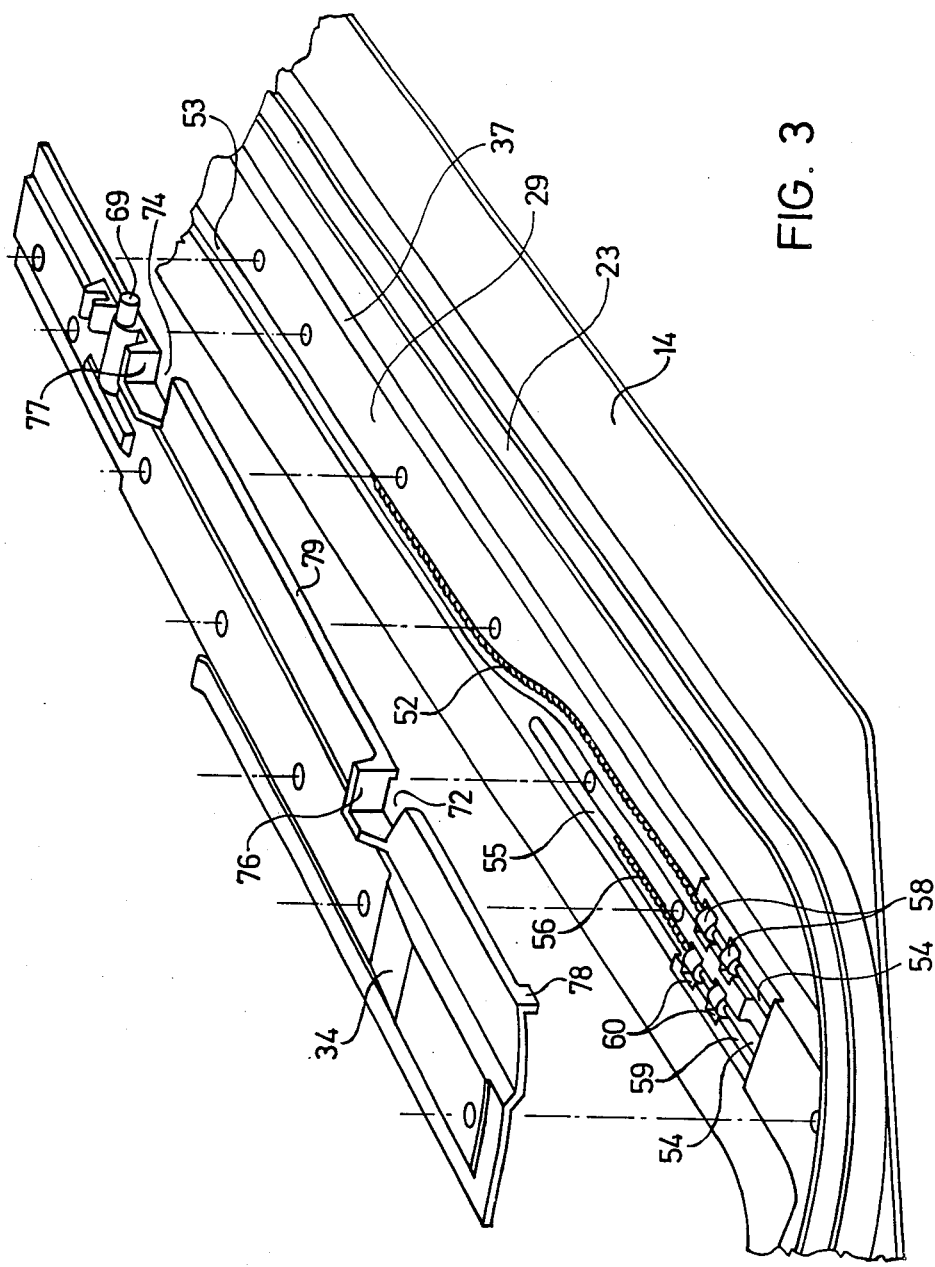
FIG. 3 is an enlarged perspective representation of the left cover rail and the matching part of the frame.

Sleeve-shaped holding elements 57 with radially projecting flanges 58 are placed on the free ends of guides pipes 54. The ends of the guide pipes, together with holding elements 57, are laid in corresponding upwardly open recesses 59 of side frame parts 28. Recesses 59 have widened enlargements 60 for receiving flanges 58 (FIG. 3). On the underside of cover rails 34 jaws 61 are formed which have a contour complementary to the outside periphery of guide pipes 54 and by which the pipes are clamped in recesses 59. Guide pipes 54, in this way, are securely connected to frame 14 and are exactly aligned in relation to cable channels 55.

Figure 4:
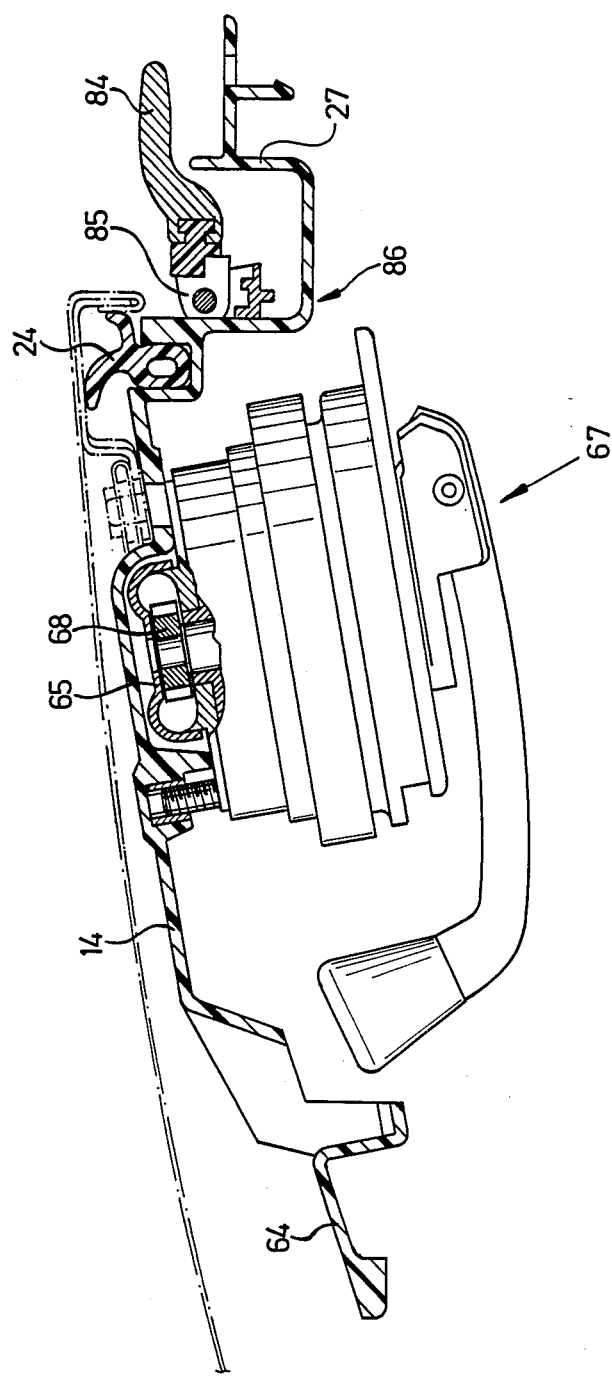

Guide pipes 54 come out through openings (not shown) in front wall 63 of water channel 25 and then run under a forward projecting extension 64 of frame 14. Near the middle of the front edge of frame opening 15, guide pipes 54 are grasped in a holding a plate 65, which for its part is connected to frame 14, for example, by rivets 66 (FIG. 5). A drive 67 in the form of a hand crank drive is illustrated in FIGS. 1 and 4. Drive 67 has a drive pinion 68. Guide pipes 54 release drive cables 52 in the area of drive pinion 68 for an engagement with this pinion. Of course, instead of a hand crank drive an electric motor drive, for example, can also be provided.

Each of cover rails 34 carries a laterally projecting link pin 69 near the rear end thereof. Link pin 69, during the sliding movement of rear sliders 44, engages a slide block guide 70 in the side surface of a respective pivot element 45 that faces away from lateral shield 43. By this engagement pivot elements 45 are pivoted around link 46 in relation to rear sliders 44, as is known in detail from U.S. Pat. No. 4,332,416 and German Auslegeschrift No. 20 16 492 and corresponding Bristish Pat. No. 1,346,506. The pivoting movement of pivot elements 45 leads to a pivoting of lateral shields 43 around an axis determined by legs 41 of angle plates 43, front sliders 40 being elastically deformed in the process.

When pivot elements 45 are raised, a laterally inwardly projecting element 71 for holding down the cover passes from the inside of lateral shields 43 through a front opening 72 of corresponding cover rail 34. In the same way, the element 73 for holding the cover down that is attached to the free end of pivot element 45 goes through an opening 74 of cover rail 34. Elevated stop surfaces 76 or 77 are formed on cover rails 34 adjacent to the back ends of openings 72, 74. When pivot elements 45 are raised and with pivoting of lateral shields 43 corresponding to outward pivoting movement of the cover, elements 71 for holding the cover down are supported on stop surfaces 76, 77. As a result, undesirable shifting movements are prevented during the outward pivoting movement. After lowering of pivot elements 45 and lateral shields 43, elements 71, 73 for holding the cover down sink into tracks 37. By elements 71, 73 for holding the cover down being held against the underside of cover rails 34 and cover strips 35, an undesirable pivoting of lateral shields 43 is eliminated during a movement of lateral shields 43 in the longitudinal direction of the vehicle.

A downwardly projecting stop 78 is formed on the front end of each of the cover rails 34. At the desired end of forward movement of front sliders 40, angle plates 42 strike strops 78. As a result, the forward movement of front sliders 40 is limited to a definite position. Further, on the outside of cover rails 34, downwardly projecting stop surfaces 79 are formed. Stop surfaces 79 engage sliders 40 around a part of their periphery and, as a result, sliders 40 are prevented from laterally slipping out of tracks 37.

Additionally, the described installation unit 13 has a gutter 81 that is guided by sliders 80 along tracks 37. Gutter 81 is connected by carriers 82 to side lateral shields 43. Carriers 82 are hinged at one end to sliders 80 and are hinged at the other end to the center are of lateral shields 43. After installation of installation unit 13 in the vehicle, gutter 81 engages under the rear edge of roof opening 16 in the positions when cover 20 is closed and when it is pivoted out. Gutter 81 has, in a way known in the art, the particular purpose of catching any water that collects on the rear fixed roof surface 17 and which, when the vehicle is braked, seeks to reach the vehicle interior through the roof opening 16.

Figure 10:
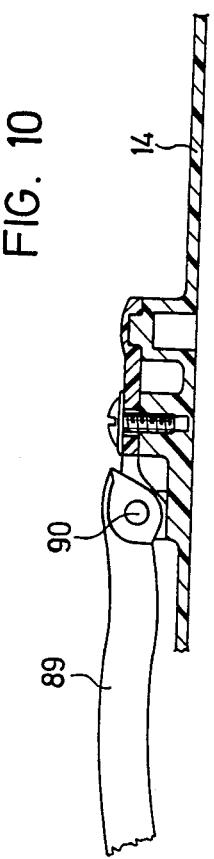

In the embodiment illustrated, installation unit 13 also has a wind deflector 84, which is pivoted on a front frame part 86 by three hinges 85 lying on a common axis. Wind deflector 84 is prestressed in the outward pivoting direction by leg springs, which, for example, are placed on the hinge axes of both outside hinges 85. A lever 89, which is connected to frame 14 at its end opposite wind deflector 84 by a joint 90, engages each side of wind deflector 84 by a pin-slotted hole connection 88 (FIG. 10). On their outside, lateral shields 43 are provided with laterally projecting cams 91 which, during forward movement of lateral shield 43, run against levers 89 and by depressing levers 89 pivot draft deflector 84 in against the force of leg springs, i.e., bring it into the position shown in FIGS. 4 and 5.

The installation unit 13, as described, can be completely preassembled by the sliding roof manufacturer and checked for trouble-free performance without cover 20 having to be put on or a cover dummy being used. On the assembly line of the vehicle manufacturer, the preassembled and tested installation unit 13 is fastened, as a whole, under fixed roof surface 17. When, a cover 20, painted, for example, in the color of the vehicle, is placed on lateral shields 43 and adjusted in height in relation to the fixed roof surface 17, for example in the way known from U.S. Pat. No. 4,332,416.

Figure 11:
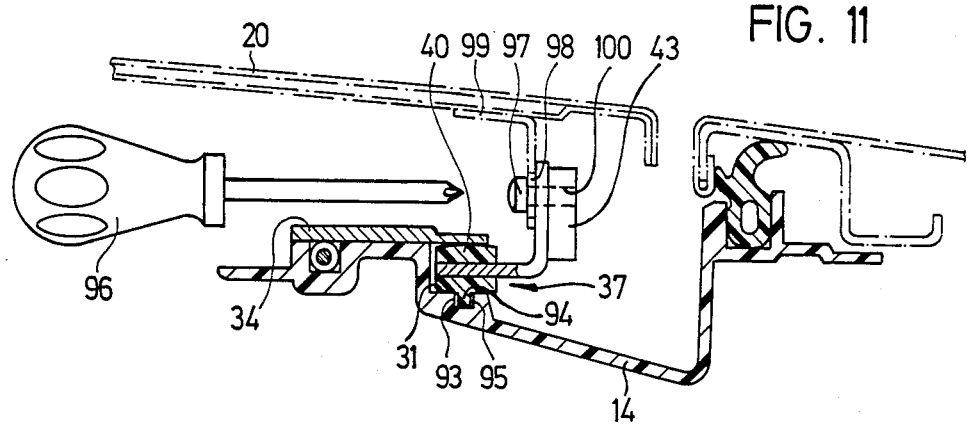
FIGS. 11, 12 and 13 are sections similar to FIG. 8, which show varied embodiments for the side guide of the front sliders.
Figure 12:
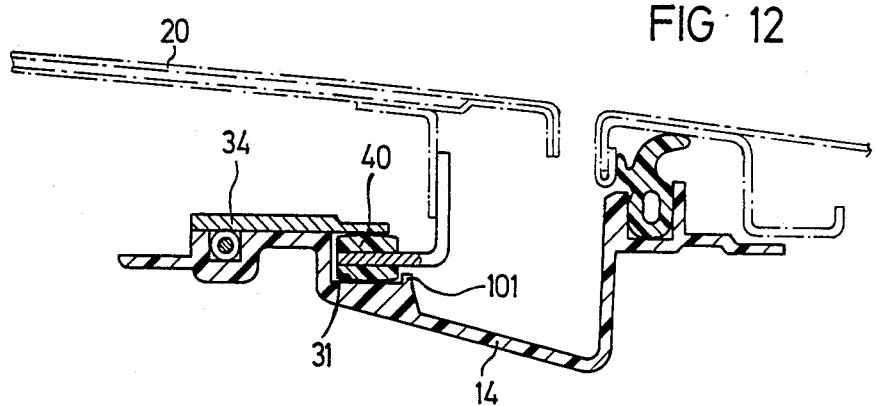
Figure 13:
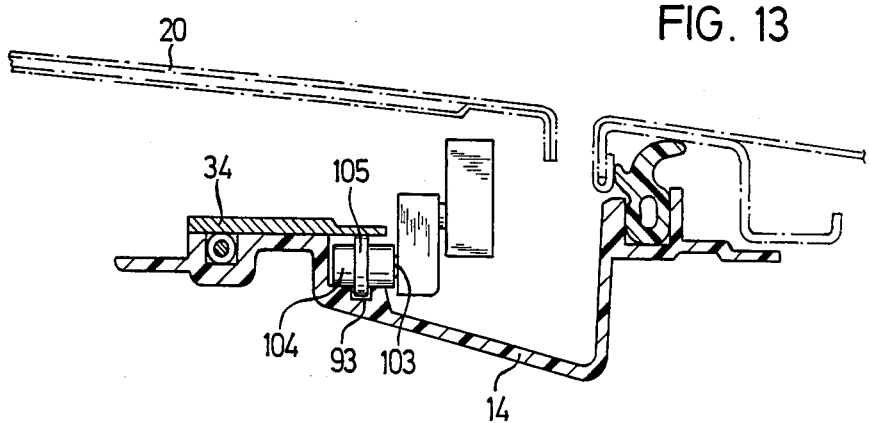

FIGS. 11 to 13 show varied embodiments for the side guiding of front sliders 40.

In the embodiment according to FIG. 11, a groove 93, running in the longitudinal direction of the track, is formed in horizontal guide surface 31 of track 37. A nose 94 on the underside of front slider 40 engages in the groove 93 so that a lateral shifting of slider 40 is prevented by the combined action of nose 94 and the external side wall of groove 93 acting as a stop surface 95. This is important not only for performance checking of installation unit 13 but also, for example, if an outwardly directed force is exerted on slider 40 due to lateral pressure being applied to tightening screw 97 by an assembly tool 96 during the height adjustment of cover 20, screw 97 extending through a slotted hole 98 of a fastening angle 99 and being screwed into a threaded hole 100 of lateral shield 43.

In the case of the embodiment according to FIG. 12, an elevated stop surface 101, which provides for a lateral guiding of slider 40, is formed on the outside of horizontal guide surface 31.

For additional lateral guiding of rear slider 44 an axially immovable roller 104 can be placed on a hinge pin 103 of joint 46 according to FIG. 13, and a flange 105 of roller 104 can engage the groove 93, provided for guidance of front slider 40 in FIG. 11.

While we have shown and described various embodiments in accordance with the present invention, it is understood that the same is not limited thereto, but is susceptible of numerous changes and modifications as known to those skilled in the art and we, therefore, do not wish to be limited to the details shown and described herein, but intend to cover all such changes and modifications as are encompassed by the scope of the appended claims.

We claim:

1. Preassembled installation unit for sliding and lifting roofs of motor vehicles of the type wherein a fixed roof surface has a roof opening that is selectively openable and closable by a cover, the roof opening being surrounded at front and sides thereof by a frame which extends rearwardly of the opening to form a space for receiving the cover behind the roof opening under the fixed roof surface, the installation unit comprising:
   (a) side guide surfaces connected to one another and forming guide rails;
   (b) front and rear sliders which are movable rearward and forward along the guide rails;
   (c) lateral shields for supporting the cover which are connected to the front sliders and, by pivoting elements, to the rear sliders;
   (d) pressure resistant drive cables which engage the rear sliders and are engageable with a drive; and
   (e) guide channels for the drive cables, the guide channels being formed by guide pipes in the area of a front edge of the roof opening and on the sides by cable channels in portions of the frame running alongside the guide rails; and
   (f) said frame being a part of said installation unit, and the guide rails and cable channels being integrated in side parts of the frame and the guide pipes for the drive cables being connected to a front area of the frame;
wherein said cable channels are upwardly open and said guide rails are upwardly and laterally open; and wherein cover rails are mounted on the side parts of the frame, at least in a forward area thereof, in a manner extending over said cable channels and guide rails, said cover rails forming a means for enabling performance testing of the installation unit without a cover or dummy cover being mounted thereto by the provision on said cover rails of stops limiting the forward movement of the front sliders and stop surfaces preventing at least the front sliders from laterally slipping out of a lateral open side of the guide rails.

2. Installation unit according to claim 1, wherein a drive for the drive cables is also a component of the installation unit.

3. Installation unit according to claim 2, wherein the drive is mounted on a front frame part connecting the side parts of the frame.

4. Installation unit according to claim 1, wherein the cover rails are provided on their underside with means for clamping the ends of the guide pipes.

5. Installation unit according to claim 1, wherein the guide pipes have ends that are turned toward front ends of the cable channels and which are put into upwardly open recesses of the side parts of the frame.

6. Installation unit according to claim 5, wherein said ends of the guide pipes are each provided with at least a radially projecting holding element which engages in a widened enlargement of a respective open recess of the side parts of the frame.

7. Installation unit according to claim 1, wherein the stop surfaces are connected as one piece with the cover rails.

8. Installation unit according to claim 7, wherein the stop surfaces are placed on the open side of the guide rails and engage around the front sliders at a part of their circumference.

9. Installation unit according to claim 1, wherein the cover rails are provided with at least one opening through which a cover hold-down element is passable during a pivotal lifting of the cover out of the roof opening.

10. Installation unit according to claim 9, wherein elevated stop surfaces are provided on the cover rails adjacent to the back end of said opening for the cover hold-down element for preventing rearward longitudinal shifting of the cover.

11. Installation unit according to claim 1, wherein the cover rails each carry a link pin which coacts with a connecting link guide of a respective pivot element for the pivotal lifting out of the cover.

12. Installation unit according to claim 1, wherein the installation unit additionally comprises a gutter that is connected to said lateral shields supporting the cover and guided by sliders along said tracks, said gutter being operative after installation of the installation unit in the vehicle, for engaging under a rear edge of the roof opening when the cover is closed and pivoted out.

13. Installation unit according to claim 1, wherein the installation unit additionally comprises a wind deflector that is hingd on a front part of the frame and is pivotable as a function of a sliding movement of lateral shields supporting the cover.

14. Installation unit according to claim 13, wherein the wind deflector is movable in an outward pivoting direction, wherein levers are hinged on two opposite ends of the wind deflector, and wherein the lateral shields are provided with cams which, during movement of the lateral shields when the cover is slid from a retracted position to a closed position, ride upon the levers to pivot the wind deflector in.

15. Installation unit according to claim 1, wherein the installation unit further comprises a seal for sealing against the underside of the fixed roof surface.

16. Installation unit of claim 1, wherein the cover rails are zinc die-cast parts.

17. Installation unit according to claim 1, wherein the frame consists of plastic.

18. Installation unit according to claim 1, wherein the front area of the frame to which said guide pipes are connected is disposed forwardly of portions of the frame surrounding the roof opening so as to underlie said fixed roof surface in front of the roof opening in an installed condition of the installation unit.

* * * * *